United States Patent [19]
Tanaka et al.

[11] 3,876,564
[45] Apr. 8, 1975

[54] PROCESS FOR PREPARING ALKYLENE OXIDE POLYMERS

[75] Inventors: Kazunobu Tanaka; Masahiko Kusumoto; Shoji Watanabe, all of Saitama; Hideo Sawada, Osaka, all of Japan

[73] Assignee: Daicel Ltd., Osaka, Japan

[22] Filed: Dec. 27, 1973

[21] Appl. No.: 428,830

[30] Foreign Application Priority Data
Dec. 27, 1972 Japan.............................. 48-1519

[52] U.S. Cl............... 260/2 A; 252/431 N; 260/615
[51] Int. Cl............................................... C08g 23/14
[58] Field of Search........................... 260/2 A, 615

[56] References Cited
UNITED STATES PATENTS
3,509,074  4/1970  Kamio et al. ..................... 260/2
3,730,922  5/1973  Boor .................................. 260/2 A Primary Examiner—Morris Liebman
Assistant Examiner—E. Nielsen
Attorney, Agent, or Firm—Woodhams, Blanchard and Flynn

[57] ABSTRACT

Alkylene oxide polymers and copolymers of excellent thermal stability are prepared by reacting (1) alkylene oxides, (2) amines, (3) organozinc compounds and (4) water, at an elevated temperature. In the process
a. aliphatic or alicyclic primary amines which have no hydrogen atom on the carbon atom in the α-position to the amino group are used as component (2),
b. a part or the entirety of component (1) and a part or the entirety of component (2) are incorporated in the polymerization system prior to contacting and mixing of component (3) with component (4),
c. the contacting of component (3) and component (4) in the polymerization system is effected at a temperature above room temperature, and
d. a non-proton organic solvent free from an unshared electron pair is used as solvent in a quantity of from 10 to 100 percent by volume, based on the volume of alkylene oxide.

7 Claims, 1 Drawing Figure

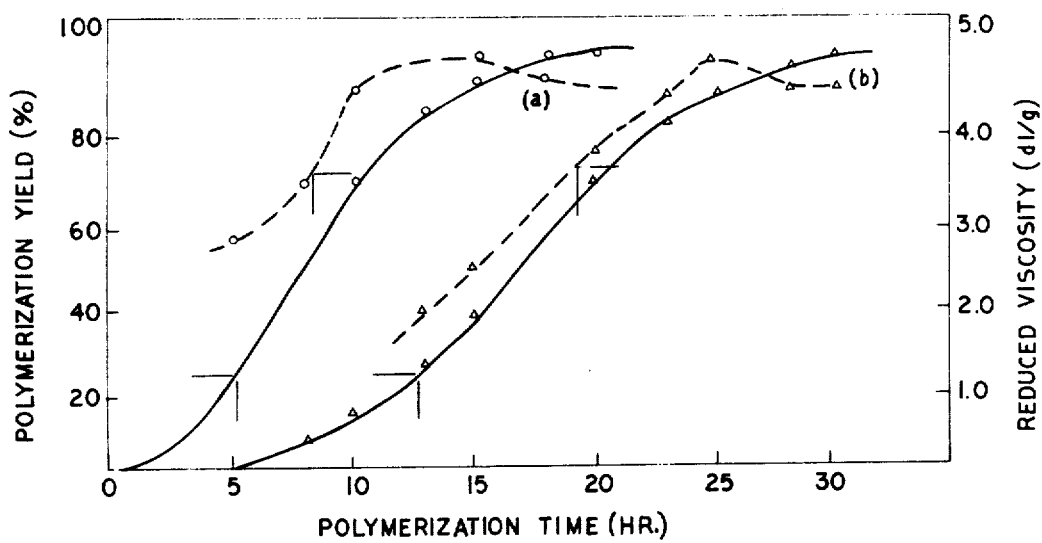

PROCESS FOR PREPARING ALKYLENE OXIDE POLYMERS

BACKGROUND OF THE INVENTION

1. Field of the Invention

This invention relates to a process for preparing alkylene oxide polymers and copolymers of excellent thermal stability in a high yield in a short period of time.

2. Description of the Prior Art

As catalysts for polymerizing alkylene oxides, it is well-known to use metal alkoxides such as aluminum alkoxides, zinc alkoxides, iron alkoxides and titanium alkoxides; organometal compounds such as organoaluminum compounds, organozinc compounds and organomagnesium compounds; alkaline earth metal compounds; Friedel-Crafts catalysts such as boron trifluoride, tin tetrachloride and zinc chloride; acids; alkalis; and mixtures of them.

However, the aforementioned polymerization catalysts are mainly used for the polymerization of ethylene oxide and propylene oxide. Only a few of them are suitable for use for the polymerization of epichlorohydrin, phenyl glycidyl ether and styrene oxide. There are only a few reports in the literature and patents about polymerization catalysts suitable for the preparation of polymers of other alkylene oxides. Particularly, there are only a few reports on the polymerization of 1,1'-disubstituted ethylene oxides. For example, for the polymerization of isobutylene oxide, there have been reported the use of tin tetrachloride or triethylaluminum-cobalt acetylacetonate as polymerization catalyst [Shu Kanbara, et al., Kobunshi Kagaku, 20, 497 (1963)] and the use of cationic catalysts and organometal catalyst [Shin'ichi Ishida, et al., Journal of the Bulletin of Chemical Society of Japan, 33, 924 (1960)]. However, in these prior processes, the resulting polymers have only quite low degrees of polymerization. Polymers of this type are hereinafter referred to as "low polymers."

Generally, the polymerization reaction of a 1,1'-disubstituted ethylene oxide is inhibited considerably by steric hindrance of the substituents. Particularly, in case of, for example, isobutylene oxide, the oxygen atom in the epoxide (oxirane) ring effects easily a coordination bond with a metal atom of the polymerization catalyst due to the electron-expelling effect of the dimethyl substituent. But if the polymerization catalyst has an excessively high activity, the activated monomer molecule is isomerized into isobutylaldehyde whereby no polymerization reaction takes place. Therefore, a highly sophisticated technique is needed, because a polymerization catalyst having a limited activity within a very narrow range must be used for obtaining polymers of high degrees of polymerization. Polymers of this latter type are sometimes hereinafter referred to as "high polymers."

As polymerization catalysts capable of preparing isobutylene oxide high polymers, it has been suggested to use dialkylzinc/water/amine catalysts (U.S. Pat. No. 3,509,074; British Pat. No. 972,898). However, these catalysts have many disadvantages. The polymerization with these catalysts requires a long polymerization time, the induction period at the initial stage of the polymerization reaction is fairly long, a low polymer is formed during the initial stage of the polymerization, and the preparation of the polymerization catalysts must be effected in a heterogeneous system, because water used as a promoter is insoluble in the organic solvent such as hexane used as diluent. Therefore, problems of, for example, reproducibility of the polymerization reaction and scaling of the equipment are caused. Further, the activity of these catalysts is apt to be influenced strongly by their water content and the purity of monomers used and it is technically difficult to obtain adequate polymerization activity.

For minimizing the disadvantages of the aforementioned process, particularly for reducing the induction period and the polymerization time, there is known a process in which there is used a catalyst system comprising a mixture of (a) a reaction product of a dialkylzinc and water and (b) a reaction product of a dialkylzinc and an amine, which reaction products were separately prepared previously (Japanese Patent Publication No. 27749/1969). In another process there is used a three component catalyst comprising a dialkylzinc, an aldehyde and a primary amine or a hydrazine (Japanese Patent Publication No. 16469/1970). However, these latter processes are still insufficient. Moreover, the times required for the preparation of the catalysts to be used in said processes are very long, that is, about 25 hours and 5 hours, respectively.

In addition, a process is known wherein a reaction product of an organozinc compound, water, an amine and 0.01–10 moles, based on the organozinc compound, of an alkylene oxide is used as a catalyst system for the purpose of shortening the induction period (Japanese Patent Publication No. 21944/1970). According to this process, even though the apparent induction period is shortened as compared with the process of U.S. Pat. No. 3,509,074, a quite long time of 17–25 hours is required for the preparation of the catalyst. Moreover, due to the fact that a hydrophilic solvent such as tetrahydrofuran or dioxane is used for the purpose of dissolving the water used as a promoter, the resulting polymerization catalyst has only a poor activity and the polymerization yield is as low as about 15% even when a polymerization temperature of 80°C is employed for 8 hours. Further, the polymerization degree of the resulting polymer is low. Accordingly, the effect of this process is also insufficient. Thus, there is a need for an improved process for carrying out this general type of polymerization.

SUMMARY OF THE INVENTION

This invention relates to a process for preparing alkylene oxide high polymers and high copolymers, in a high yield, within a short period of time, by reacting (1) alkylene oxide or mixture of alkylene oxides, (2) aliphatic or alicyclic primary amines ($RNH_2$) containing no hydrogen atom on the carbon atom of R in the α-position to the amino group, (3) organozinc compounds and (4) water, in which (a) a part or the entirety of component (1) and a part or the entirety of component (2) are incorporated prior to contacting and mixing of component (3) with component (4), (b) the contact of component (3) and component (4) is effected at a temperature above room temperature and (c) a non-proton organic solvent free from an unshared electron pair is used in a quantity of 10 to 100 volume percent, based on the alkylene oxide(s) (1).

It was not expected that alkylene oxide high polymers and high copolymers of excellent thermal stability could be obtained in a high yield as described below, within a short period of time, according to the process of the present invention. The process of the present invention is novel and highly useful.

Although the precise nature of the active components of the catalysts used in the present invention has not been elucidated completely yet, it is apparent from the high polymerization velocity that is observed, that they are novel and different from the active components of any known catalyst system.

The principal advantages of the present invention are described below.

First, the catalyst system of the process of the present invention has a very high polymerization activity as compared with known catalyst systems used in conventional polymerization processes, particularly for the polymerization of 1,1'-disubstituted ethylene oxide. When the catalyst system of the invention is used, the induction period in the polymerization reaction is minimal and the polymerization velocity is particularly high, whereby a polymer of a high molecular weight is formed with a high polymerization yield, within a short period of time.

Second, according to the process of the present invention, alkylene oxide high polymers and high copolymers having quite excellent thermal stability can be obtained. Although a relatively high polymerization velocity can be obtained by employing a mass polymerization technique wherein a solvent is not used, even if an amine of low activity such as cyclohexylamine (which is outside the scope of the present invention) is used, the thermal stability of the resulting polymer is very low in such a case, because a low polymer is formed in a large amount during the initial stage of the polymerization and the efficiency of the stage for purifying the polymer is poor.

On the other hand, according to the process of the present invention, such a disadvantage can be avoided and alkylene oxide high polymers and high copolymers of excellent thermal stability can be obtained in a high yield within a short period of time without damaging the high activity of the catalyst of the invention by using 10 to 100%, by volume, based on the total alkylene oxides, of a non-proton organic solvent free from an unshared electron pair.

Third, according to the process of the present invention, by mixing and contacting component (3), an organozinc compound, with component (4), water, in the presence of a part or the entirety of component (1), alkylene oxide, and component (2), an aliphatic or alicyclic primary amine containing no hydrogen on the carbon atom in the α-position to the amino group, the four components react together smoothly to form an active catalyst and at the same time to initiate the polymerization reaction of the alkylene oxide. Therefore, the following advantages can be obtained, in comparison with conventional dialkylzinc/water/amine catalysts or dialkylzinc/amine/aldehyde catalysts, which require a long preparation time:

1. the duration of the total reaction cycle can be reduced greatly,
2. the process is economical, because devices such as tanks for the separate preparation of the catalyst are unnecessary, and
3. the process is advantageous from the viewpoint of reaction engineering, because the alkylene oxide acts also as a solvent.

Fourth, in the conventional process wherein a reaction for preparing a catalyst prior to the polymerization reaction is effected at a low temperature under ice-cooling or below room temperature (18° to 25°C), the amount of low polymer formed becomes high and consequently, a bad effect is exerted on the thermal stability of the resulting polymer. However, according to the process of the present invention, such disadvantage can be eliminated by reacting the reaction mixture under heating to at least room temperature from the start of the reaction.

One of the reasons for this improvement is considered to be that, when the reaction is carried out at a temperature of at least as high as room temperature, the reactivities of amines and alkylene oxides on organozinc compounds are increased to cause a smooth reaction of the catalyst components, whereas when the reaction for the preparation of the catalyst is carried out at a low temperature below room temperature, the amines and alkylene oxides have far lower reactivities with the organozinc compounds than does water and they do not participate sufficiently in the reaction. That is, only the reaction of the organozinc compounds and water proceeds substantially at temperature below room temperature whereby the resulting catalysts do not give an adequate effect in the polymerization reaction.

Fifth, when the water used as promoter is dissolved in the alkylene oxide, the reaction can be carried out in a homogeneous system and, therefore, the reproducibility of the reaction is high and the disadvantageous scaling effect, which is observed in a heterogeneous system, does not substantially occur. For example, in the conventional processes for the polymerization of isobutylene oxide, water is dispersed in a hydrophobic organic solvent, the dispersion is mixed with an organozinc compound or another promoter and the catalyst-forming reaction is effected under ice-cooling or at room temperature, or alternatively water is dissolved therein by using a hydrophilic organic solvent such as tetrahydrofuran or dioxane and the reaction is carried out under heating. However, in the former process, the reproducibility of the polymerization is low depending on the degree of stirring and the amount of scaling of the equipment is high. In the latter process, the polymerization reaction is inhibited by coordination of the solvent with the polymerization active sites. According to the process of the present invention, such disadvantages of the conventional processes can be avoided.

The alkylene oxide monomers employed in the process of this invention are compounds of the formula:

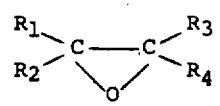

wherein $R_1$, $R_2$, $R_3$ and $R_4$, which can be the same or different, each represent hydrogen or a monovalent organic radical containing no element other than carbon, hydrogen or ether oxygen. A wide variety of polymerizable alkylene oxides are generally known and are usable in this invention. Some or all of $R_1$, $R_2$, $R_3$ and $R_4$, together, can form a ring.

The monovalent organic radical preferably is alkyl or alkenyl having from 1 to 8 carbon atoms, cycloalkyl and cycloalkenyl having 3 to 8 carbon atoms, aryl especially phenyl, aralkyl, alhoxyalkyl, alkenoxyalkyl, aryloxyalkyl, etc. Representative examples of suitable alkylene oxides include, for example, ethylene oxide, propylene oxide, 1-butylene oxide, 2-methyl- or 2-ethylbutylene oxide-1, 2-butylene oxide, 2-methyl- or 2-ethylbutylene oxide-2, isobutylene oxide, tri- or tetramethylethylene oxide, 1-epoxyoctane, butadiene mono- or dioxide, isoprene mono- or dioxide, cyclohexene oxide, 1-methyl- or 1-ethylcyclohexene oxide, styrene oxide, α-methylstyrene oxide, phenyl glycidyl ether, ethyl glycidyl ether and allyl glycidyl ether. The alkylene oxides can be used alone or mixtures of two or more alkylene oxides can be used as monomers. The process of the present invention is particularly effective for the preparation of polymers of 1,1′-disubstituted ethylene oxides and derivatives thereof. Isobutylene oxide is especially preferred.

The alkylene oxide or oxides used as a component of the catalyst is the same as the alkylene oxide or oxides to be polymerized. In case of copolymerization of alkylene oxides, at least one or more of the alkylene oxide monomer components to be copolymerized are contained in the catalyst.

The organozinc compounds used in the present invention are dihydrocarbon zinc compounds of the formula:

$$ZnRR'$$

wherein R and R' each represent an aliphatic, alicyclic, aromatic or araliphatic hydrocarbon group. It is preferred to employ organozinc compounds of the foregoing formula in which R and R' each are methyl, ethyl, propyl, isopropyl, butyl, isobutyl, tert.-butyl, pentyl, isopentyl or a higher hydrocarbon group. These compounds are widely known and used for alkylene oxide polymerizations and need not be further described.

The amines used in the present invention are limited particularly to aliphatic or alicyclic primary amines containing no hydrogen atom on the carbon atom of the aliphatic or alicyclic radical R in α-position to the amino group. As the amines, there can be mentioned primary amines substituted with a tert.-alkyl group having 4 to 8 carbon atoms and derivatives thereof such as tert.-butylamine, tert.-pentylamine, tert.-hexylamine, tert.-heptylamine and tert.-octylamine; and cycloalkyl primary amines having 3 to 8 carbon atoms and having substituted on the carbon atom in α-position to the amino group, an alkyl group having 1 to 6 carbon atoms and derivatives thereof, such as 1-methyl-cyclobutylamine, 1-methyl-cyclopentylamine, 1-methyl-cyclohexylamine and 1-ethyl-cyclohexylamine. When an amine containing at least one hydrogen atom in the α-position to the amino group such as n-propylamine, isopropylamine or cyclohexylamine is used, the effect of the present invention cannot be obtained. However, by replacing all the hydrogen atoms of the carbon atom in α-position to the amino group by aliphatic or alicyclic radicals, the basicity of amines is remarkably increased. For example, in view of the order of basicity $H_3C-NH_2(3.38)$ ~ $H_3C-CH_2-NH_2(3.37)$ ~ $(H_3C)_2CH-NH_2(3.38)$ << $(H_3C)_3CNH_2(3.55)$ (numerals in the parentheses are values of -logKb) [H. K. Hall, J. Am. Chem. Soc. 79, 5441 (1957)] and from the fact that the basicity of amines is increased as the branching coefficient in the α-position is increased, for example, $H_3C(CH_2)_3-NH_2$ (3.41) < $H_3C-CH_2-CH(CH_3)-NH_2(3.44)$ < $(H_3C)_3CNH_2(3.55)$ [H. K. Hall, J. Am. Chem. Soc. 79, 5441 (1957)], it is considered that the basicity of the amines to be added to the polymerization system exerts a very important effect on the polymerization activity. An unexpected effect of the present invention is that a remarkable increase in polymerization velocity can be obtained by employing the limited class of amines described above.

Although the amount of the organozinc compound employed in the present invention is not critical, it is preferred to use same in an amount of from 1/10 to 1/100 mole, per mole of total alkylene oxide monomer.

The amount of alkylene oxides added at the start of the reaction is also not critical, but the best results are obtained if they are used in an amount of at least 10 moles per mole of the organozinc compound.

Water is used in a quantity of from 1/10 to 1 mole per mole of the organozinc compound.

In general, the amine is used in an amount of 1/10 to 1 mole per mole of the organozinc compound, though the amount for best results varies within that range depending upon the specific amine employed. The amount of the amine added at the start of the reaction is not critical, but the best results are obtained if it is used in an amount of at least 0.1 mol per mole of the organozinc compound.

The sum of the amounts of water and amine used in the process is variable because the effect of varying such amounts on the polymerization velocity, the polymerization degree of the resulting polymer, the distribution of the polymerization degree and the crystallization property also depend on the reaction temperature, reaction period, reaction pressure, other reaction conditions and the specific amine employed. However, in general, the highest activity is obtained when 1 mole total of water plus amine is used, per mole of the organozinc compound. Therefore, it is desirable to use a sum of one-fifth to 2 moles of water plus amine, per mole of the organozinc compound.

The polymerization temperature employed in process of the invention is not critical. Generally a temperature in the range of 30° to 250°C, preferably 50° to 150°C, is employed. Similarly, the reaction pressure is not critical. Usually the process will be carried out under autogenous pressure, but superatmospheric pressures up to several hundred pounds may be used, if desired, and subatmospheric pressures can also be used.

The polymerization should generally be conducted in an inert ambient atmosphere, such as nitrogen.

With regard to the solvent system of the present invention, the alkylene oxide monomer per se has a solvent action. However, in order to increase the thermal stability of the resulting polymer, it is essential to use an additional solvent in an amount of from 10 to 100 percent by volume, based on the volume of the alkylene oxides. According to the prior art, a considerable increase in polymerization velocity can be obtained if the quantity of solvent is small, particularly in a mass polymerization process. However, in such a case, a remarkable reduction in the polymerization degree occurs in the operation of melt molding of the polymer and the molded product is colored or it is brittle and easily broken by a small stress.

After intensive investigations, we have found that a polymer of excellent thermal stability can be obtained, at a high polymerization velocity, by using in the polymerization system a special class of solvents in a quantity of at least one-tenth parts by volume of solvent, per one part by volume of alkylene oxide. The solvents which can be used are critical. Non-proton or aprotic organic solvents which do not form complexes, i.e., those having no unshared electron-pair, are employed. The solvents usable in the invention include inert hydrocarbon solvents such as aliphatic, alicyclic and aromatic hydrocarbons, for example, pentane, hexane, heptane, octane, cyclopentane, cyclohexane, benzene, toluene, xylene, declain and tetralin. As for the upper limit of the quantity of the solvent, a sufficient effect can be obtained employing a quantity of not more than one part by volume of solvent per one part by volume of the alkylene oxide monomer. The use of a higher amount of solvent is disadvantageous, though not harmful to the reaction.

With regard to the order and mode of the addition of (1) alkylene oxides, (2) amines, (3) organozinc compounds and (4) water, at the start of the reaction, it is necessary to add a part or the entirety of component (1) and a part or the entirety of component (2), prior to adding and contact between components (3) and (4) in the polymerization system. The order of addition of the solvent is not critical. Various methods of adding the components can be adopted provided that the above-stated sequence is followed. Thus, the alkylene oxide, amine and water can be mixed and then the organozinc compound added. Or, the alkylene oxide, amine and organozinc compound can be mixed and then the water added. The solvent is usually added at the start, but it can be added later.

The reasons for the above-stated sequence of adding the components into the polymerization system are as follows. If the organozinc compound and water are added prior to the alkylene oxide, the reaction of only water and the organozinc compound proceeds even in the presence of an amine, since water is insoluble in the solvent used. Therefore, the amine and the subsequently added alkylene oxide do not participate in the reaction sufficiently, whereby the desired result cannot be obtained. In additon, the reproducibility of the reaction is poor, because the reaction product of only the organozinc compound and water is insoluble in the reaction system. The use of solvents in which water is soluble is disadvantageous, for the reasons discussed above, because such solvents have an unshared electron pair. If no solvent is used, the reaction is abnormally violent and a smooth reaction cannot be expected.

If the organozinc compound and water are added prior to the amine, the reaction of only the former two compounds proceeds and, therefore, the desired effect cannot be obtained.

The temperature of the polymerization system at the time the organozinc compound and water are first contacted with each other, as well as the reaction temperature must be at least room temperature and desirably below 100°C.

As will be described below with reference to examples, the temperature during the addition of the above components and the initial reaction temperature must be at least room temperature, preferably at least 30°C. If these temperatures are increased, more desirable results such as higher polymerization velocity are obtained. Although the reasons therefor have not been elucidated sufficiently, it is considered that the phenomenon is mainly due to the fact that the difference in reactivities of (1) water and the organozinc compound and (2) the amine and the organozinc compound becomes smaller as the temperature becomes higher and, accordingly, the respective components react suitably to give a desirable catalyst activity. However, the use of a reaction temperature for higher than the boiling points of respective components is undesirable, because volatile components are formed as reaction fragments from the organozinc compound (for example, ethane gas from diethyl zinc) during the initial stage of the reaction and, therefore, it is more economical to use a closed polymerization vessel than open polymerization vessel. The temperature of the addition of the components and the initial reaction temperature have optimum ranges [for example, 30°- 50°C for diethyl zinc/water/tert.-butylamine (boiling point: about 46°C)/isobutylene oxide (boiling point: about 52°C)]. The optimum temperature range in any specific procedure depends on thr particular reaction components employed. If a temperature below room temperature is employed, the desired effect cannot be obtained, because only the reaction of organozinc compound and water proceeds substantially, thereby reducing the polymerization velocity. Further, the amount of low molecular weight polymers is increased and the thermal stability of the polymer product is reduced unfavorably.

The process of the present invention will be further described by reference to the following illustrative examples, which do not limit the scope of the invention

BRIEF DESCRIPTION OF THE DRAWING

The drawing is a graph showing the polymerization promoting effect according to the process of the present invention. Curves (a) shows the results of Example 1 of the present invention and curves (b) shows the results of Comparative Example 1. The solid lines show the polymerization yield/time curves and the dotted lines show the reduced viscosity/time curves.

EXAMPLE 1

This example shows the remarkable increase in polymerization velocity obtained by the process of the present invention.

Into a sealable glass tube, there were charged at room temperature 40 parts of hexane, 50 parts of iosbutylene oxide, 0.14 part of water and 0.6 part (0.35 mole per mole of diethyl zinc) of tert-butylamine, under nitrogen atmosphere. After the temperature was raised to 50°C, 3.0 parts of diethyl zinc were added thereto and the reaction was carried out at 50°C for 20 minutes. The reaction liquor was homogeneous, colorless and transparent.

Then, 50 parts of isobutylene oxide were added thereto and the glass tube was sealed. Polymerization was effected at a constant temperature bath kept at 80°C for a predetermined period of time. Directly after the initiation of the polymerization, the precipitation of white polymer was observed. After 2 hours, the the mixture was in gel form. After about 10 hours, an elastic white mass of polymer was obtained. The resulting polymer was milled or broken up in methanol acidified with hydrochloric acid, filtered, washed first with water and then with methanol to remove catalyst residue and dried with hot air. The yield of the polymer product was determined by the gravimetric method.

The relationship between polymerization time and polymerization yield and between polymerization time and reduced viscosity (dl/g) of the resulting polymer are shown by the curves (a) of the drawing. The reduced viscosity was determined by dissolving the isobutylene oxide polymer, with heating, in o-dichlorobenzene containing 0.10 part by weight (per part of solvent) of zinc dibutyldithiocarbamate as thermal stabilizer under a nitrogen atmosphere and measuring the viscosity with an Ubbelohde's viscometer at 110°C.

A powdery sample of polyisobutylene oxide obtained by 15 hours' polymerization was mixed with a suitable thermal stabilizer and formed into press sheets. The press sheets were white and tough. The sheets had a specific gravity of 1.02, a tensile strength of 480 Kg/cm$^2$, a Rockwell surface hardness of M-74, an excellent resistance to chemicals and excellent creep property and low temperature property.

COMPARATIVE EXAMPLE 1

In the same manner as in Example 1, 0.14 part of water and 0.6 part of tert.-butylamine were added to 40 parts of hexane. The temperature was raised to 50°C and 3.0 parts of diethyl zinc were added thereto with stirring and a reaction was effected at 50°C for 20 minutes to form a partly yellow precipitate. 100 Parts of isobutylene oxide monomer were added thereto and the polymerization was effected at 80°C for a predetermined period of time. Thereafter, the polymerization yield and reduced viscosity were determined in the same manner as in Example 1. The results are shown in curves (b) of the drawing.

From the curves (a) and (b) of the drawing, it is apparent that, as compared with the process of Comparative Example 1, the process of Example 1 exhibited a far faster polymerization velocity and no substantial induction period was observed in Example 1. The reason why such a high effect of increasing the polymerization velocity is obtained is considered to be that, by the addition of alkylene oxide at the initial stage of the reaction, a part of the alkylene oxide acts as a catalyst component and there occurs a coordination reaction and initiation reaction of the alkylene oxide monomer with the active catalyst and the alkylene oxide per se acts as a solvent to promote those reactions.

EXAMPLES 2-3 and Comparative Examples 2-4

Polymerization was effected in the same manner as in Example 1 except that the compounds (in an amount of 0.35 mole per mole of diethyl zinc) shown in the following table were used as amines to obtain the results shown in Table 1. Comparing the results, it is apparent that the polymers can be obtained in a high yield within a very short time when amines containing no hydrogen on the carbon atom in α-position to the amino group are used, whereas the polymerization velocities are low and the desired results cannot be obtained when amines containing at least one hydrogen atom on the carbon atom in α-position to the amino group are used.

Table 1

| Example | Amine | Amount of amine | Polymerization condition | Polymerization yield (%) | Reduced viscosity |
|---|---|---|---|---|---|
| Example 2 | Tert.-Octylamine | 1.1 | 70°C/13hr | 87.1 | 4.1 |
| Example 3 | 1-Methyl-cyclohexylamine | 0.96 | ditto | 75.0 | 4.4 |
| Comparative Example 2 | Cyclohexyl-amine | 0.84 | ditto | 5.8 | 0.4 |
| Comparative Example 3 | Isopropyl-amine | 0.48 | 70°C/53hr | 52.0 | 5.9 |
| Comparative Example 4 | n-propyl-amine | 0.48 | 70°C/72hr | 52.2 | 3.2 |
|  |  |  | 70°C/96hr | 18.8 | 3.0 |

EXAMPLES 4-6 and Comparative Example 5

These examples show that, if the reaction for the preparation of catalyst prior to the polymerization reaction is effected at a temperature above room temperature, an excellent effect is obtained and better results are obtained as the temperature is elevated within the experimental range, whereas if the reaction for the preparation of catalyst is effected at a temperature below room temperature, the polymerization velocity is low and thermal stability of the resulting polymer is far inferior. The results obtained under various conditions of the preparation of catalyst are shown in Table 2.

Table 2

| Example | Preparation condition of catalyst (temperature/time) | Polymer yield (%) (Note 1) | Reduced viscosity (Note 5) (dl/g) | Thermal decomposition initiation temperature (%) (Note 2) | Amount of component soluble in hot hexane (%) (Note 4) (Note 3) | Reduced viscosity of component in hot hexane (Note 5) (dl/g) | Thermal decomposition initiation temperature of component soluble in hot hexane (°C) (Note 2) |
|---|---|---|---|---|---|---|---|
| Comparative Example 5 | 0°C/30 minutes | 48.4 | 5.0 | 174.5 | 5.2 | 0.18 | 195.0 |
| Example 4 | 30°C/20 minutes | 72.3 | 4.6 | 189.8 | 3.0 | — | 211.0 |
| Example 5 | 40°C/20 minutes | 78.1 | 4.1 | — | — | — | — |
| Example 6 | 45°C/20 minutes | 82.6 | 4.5 | — | — | — | — |
| Example 2 | 50°C/20 minutes | 87.1 | 4.1 | 192.5 | 2.8 | 0.32 | 212.5 |

(Note 1) In all cases, the polymerization was effected at 70°C for 13 hours.
(Note 2) Determination was made using a thermoflex thermobalance measuring device manufactured by Rigaku Denki Kogyo K.K. in an air stream in the absence of additive.
(Note 3) Extraction with hot hexane was effected with a Soxhlet's extractor for 5 hours.
(Note 4) It was confirmed by infrared absorption spectrum that the component soluble in hot hexane had the same structure as that of polyisobutylene oxide.
(Note 5) Reduced viscosity was measured by dissolving the component in o-dichlorobenzene at 110°C (dl/g).

Into a sealable glass tube, were charged 40 parts of isobutylene oxide, 0.5 part of water and 2.64 parts of cyclohexylamine, under nitrogen atmosphere. After the temperature was raised to 50°C, 9.0 parts of diethyl zinc were added thereto and the reaction was carried out at 50°C for 20 minutes. An additional 60 parts of isobutylene oxide were added thereto and the reaction was effected at 80°C. After polymerization for 4 hours, polymerization yield was 14.6% and the reduced viscosity was 0.8 (dl/g). After polymerization for 15 hours, the polymerization yield was 78.2% and the reduced viscosity was 2.7 (dl/g).

A sample obtained by the polymerization for 10 hours was mixed with an antioxidant and molded into press sheets at 190°C. The sheets were light yellow and broke readily. The reduced viscosity of the sheets was as low as 1.24 (dl/g).

The same reaction was effected for 6 hours by using 1.85 parts of tert.-butylamine in place of 2.64 parts of cyclohexylamine to obtain a sample at a polymerization yield of 85.4% and a reduced viscosity of 3.2 (dl/g). Press sheets obtained from the sample exhibited a similar behavior as described above and the reduced viscosity was lowered to 1.58 (dl/g).

Thus, if a mass polymerization technique is employed, the thermal stability of the resulting polymer is reduced remarkably, although the polymerization velocity is high.

EXAMPLE 7

In a 1 liter glass autoclave, there were charged 100 parts of isobutylene oxide and (2) 2.25 parts of tert.-butylamine, under nitrogen atmosphere. After the temperature was raised to 30°C, (3) 9.0 parts of diethyl zinc dissolved in 15 parts of hexane were charged therein. Then, with stirring, (4) 0.42 part of water was added thereto and the mixture was reacted at 70°C for 10 hours. The resulting white mass was broken roughly and then further broken with a Henschel mixer. The product was washed in ethanol acidified with hydrochloric acid, then with methanol and finally with water and dried with hot air. The resulting polymer had a polymerization yield of 78.0% and a reduced viscosity of 3.9 (dl/g). The polymer was mixed with an antioxidant and pressed at 190°C to obtain a white, tough plate molded product. The reduced viscosity of the product was 3.5 (dl/g).

COMPARATIVE EXAMPLE 7

The procedure of Example 7 was repeated, except that component (4) was added at 30°C to components (1) and (3). A violent exothermic reaction occurred and the reaction components became pale yellow in color. Component (2) was added thereto to initiate the reaction in the same manner as above. Only a very small amount of white precipitate formed. Even after 10 hours, the formation of high polymer could not be observed. When component (4) was added to components (2) and (3) in the absence of component (1), the formed white precipitate scattered and adhered to the surface of the reaction vessel because of the violent reaction and the reproducibility of the reaction was poor.

EXAMPLE 8

Into a sealable glass tube replaced with nitrogen, there were charged 70 parts of isobutylene oxide, 30 parts of phenyl glycidyl ether, 0.5 part of water and 1.9 parts of tert-butylamine. After temperature was raised to 50°C, 9.0 parts of diethyl zinc and 65 parts of hexane were added thereto. The glass tube was sealed and allowed to stand in a constant temperature both at 80°C for 37 hours to obtain polymer in the form of an elastic white mass in a polymerization yield of 90.0%. The reduced viscosity of the polymer was 2.4 (dl/g). The melting point of the polymer was measured but it did not melt completely even at 200°C. The NMR absorption spectrum of the resulting polymer showed respective absorptions. The polymer was subjected to extraction by heating with cyclohexanone, in which polyisobutylene oxide does not dissolve but in which polyphenyl glycidyl ether dissolves easily, at 110 C for 24 hours in the presence of a thermal stabilizer. The weight loss was as low as 5.2 wt.%. From those facts, it was confirmed that the major part of the resulting polymer was a copolymer of both alkylene oxide monomers.

COMPARATIVE EXAMPLE 8

A copolymerization reaction was carried out by using the catalyst prepared in comparative Example 1 under the same condition as in Example 8.
The yield of the resulting copolymer was 47.1%.
The reduced viscosity thereof was 2.6 (dl/g).

EXAMPLE 9

A polymerization was carried out in the same manner as in Example 8 except that 80 parts of isobutylene oxide and 20 parts of cyclohexene oxide were used as monomers. The yield of the resulting polymer was 93.1%. The reduced viscosity was 1.8 (dl/g).

COMPARATIVE EXAMPLE 9

A copolymerization reaction was carried out by using the catalyst prepared in comparative Example 1 under the same conditions as in Example 9. The yield of the polymerization was 52.6%. The reduced viscosity was 2.1 (dl/g).

The embodiments of the invention in which an exclusive property or privilege is claimed are defined as follows:

1. In a process for preparing high molecular weight poly(epoxides) by polymerizing at least one epoxide wherein the epoxy group is an oxirane ring, in the presence of dihydrocarbon zinc, an amine, water and an inert solvent, the improvement which comprises
   placing at least a portion of said epoxide and a portion of said amine into the polymerization system prior to contact therein between said dihydrocarbon zinc and said water, said amine being an aliphatic or alicyclic primary monoamine free of hydrogen atom on the carbon atom in α-position to the amino group, said solvent being a hydrocarbon solvent free of an unshared electron pair and being present in the polymerization system in an amount of from 10 to 100 percent by volume, based on the volume of epoxide in the polymerization system,
   separately adding said dihydrocarbon zinc and water so that contact between said dihydrocarbon zinc and water occurs only in the polymerization system said contact occurring already containing said epoxide and said amine, at a temperature above room temperature and effecting the polymerization reaction to form poly(epoxide) of high molecular weight and high thermal stability, in high yield.

2. A process according to claim 1, in which the epoxide is an alkylene oxide.

3. A process according to claim 1, in which the alkylene oxide is isobutylene oxide.

4. A process according to claim 1, in which the epoxide is a mixture of alkylene oxides.

5. A process according to claim 1, in which one of said alkylene oxides is isobutylene oxide.

6. A process according to claim 1, in which said dihydrocarbon zinc is dialkyl zinc.

7. A process according to claim 1, in which said amine has the formula $RNH_2$ wherein R is selected from the group consisting of tert.-alkyl having four to eight carbon atoms and cycloalkyl having three to eight carbon atoms substituted at the carbon atom in the $\alpha$-position to $-NH_2$ with alkyl having one to six carbon atoms.

* * * * *